H. KURTH.
Seed-Separators.
No. 155,735. Patented Oct. 6, 1874.
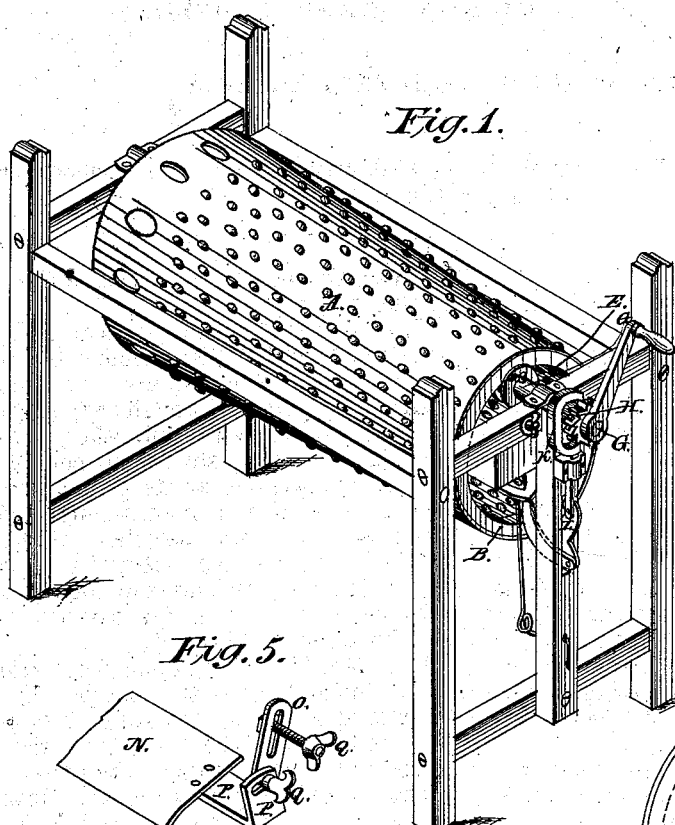
Fig. 1.
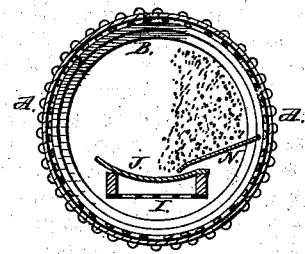
Fig. 2.
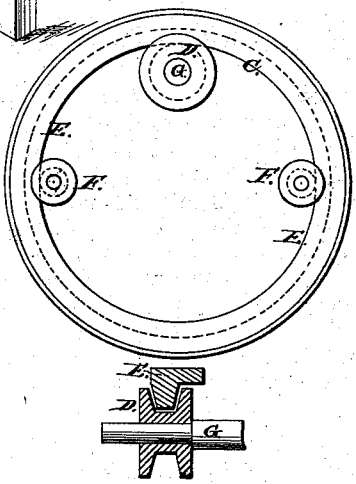
Fig. 4.
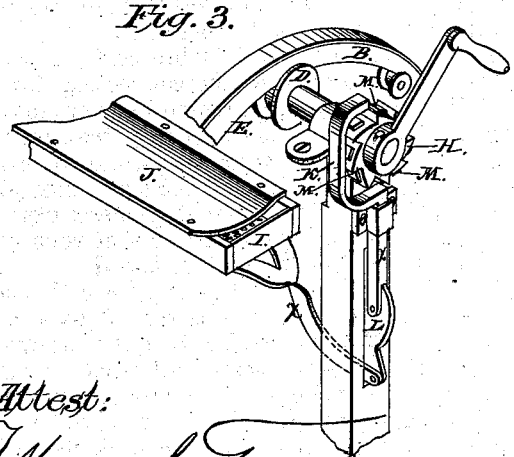
Fig. 5.
Fig. 3.
Attest: Wenzel Toepfer, Leonard W. Haley, Will aw
Inventor: Hermann Kurth

UNITED STATES PATENT OFFICE.

HERMANN KURTH, OF MILWAUKEE, WISCONSIN.

IMPROVEMENT IN SEED-SEPARATORS.

Specification forming part of Letters Patent No. 155,735, dated October 6, 1874; application filed November 29, 1873.

*To all whom it may concern:*

Be it known that I, HERMANN KURTH, of the city and county of Milwaukee and State of Wisconsin, have invented a new and Improved Wheat-Cleaner; and I do hereby declare that the following is a full, clear, and exact description of the same, reference being had to the accompanying drawing, forming a part of this specification, in which—

Figure 1 is a perspective view of the machine. Fig. 2 is a cross-section of the cylinder. Fig. 3 is a detail perspective view of the main operative parts. Fig. 4 shows an end view of the cylinder and arrangement of rollers for supporting and rotating it. Fig. 5 is a detail perspective view, showing the devices for suspending and adjusting the inclined plate or shelf on which the cockle-seed falls.

The invention relates to improved means for freeing wheat of light or defective grains; also, cockle or other foreign seeds.

The improvements consist in the arrangement of parts for vibrating a sieve or cleaner within the cylinder; the arrangement of an adjustable inclined plate or board to convey defective wheat-grains and cockle and other foreign seeds from the inner periphery of the cylinder to a reciprocating trough located above the sieve, by which they are discharged; and in attaching elastic blocks to the wiper-wheel to break the fall or concussion of the yoke, whose movement imparts vibratory movements to the sieve.

The sheet-metal cylinder A has the form of a truncated cone, and is struck up or otherwise provided on its inner surface with numerous cavities or receptacles for cockle-seed and other matter foreign to the grain. Cast-metal rings B and C are applied to the smaller and larger ends of the cylinder, respectively. These have inwardly-projecting flanges E, which fit in circumferential grooves of wheels D that are fixed on the shaft G, which extends through the cylinder. Thus, when the shaft is revolved, the friction is sufficient to rotate the cylinder.

To guide the cylinder in its rotation, or prevent vibratory movement, I provide small friction-wheels F, the same being arranged at laterally-opposite sides of the cylinder, and grooved like wheels D to receive the flanges of rings B and C.

The cleaner I, which is arranged within and lengthwise of the cylinder, has a perforated bottom, and imperforate sheet-metal top or cover J, which is trough-shaped, to adapt it to receive the cockle and other small seeds from the inclined plate N, and conduct them out of the cylinder at its larger end. The plate N is, for this purpose, arranged with one side close to the inner periphery of the cylinder, and the other over the trough J, so that, as the cylinder revolves, the cockle-seed will fall upon it in leaving the cavities in which they have found lodgment.

The plate N may be adjusted at various angles or inclinations to the trough J by means of bolts or screws Q Q passing through slots in arms O and P, the latter of which is attached to the under side of the plate.

The perforated bottom of the cleaner I is of less length than its top J, so that the larger or perfect grain, which will not pass through the holes in said bottom, will be delivered at the lower end and fall through the holes in the larger end of the cylinder.

The cleaner is vibrated by a wiper-wheel, H, and yoke K, the connecting devices being rods *x x* and a pivoted knee or elbow lever, L. The yoke K is curved, so that its upper end rests on the wiper-wheel, and the latter is provided with elastic blocks or pieces M to break the fall of the yoke as it passes from one tooth to another while the wheel revolves on the shaft G on which it is keyed.

From the foregoing it will be seen that, when the shaft G is turned by a hand-crank or other means, the cylinder is revolved, and the sieve or cleaner vibrated by the passage of the yoke over the wiper-wheel, so that the grain fed into the sieve is sorted, the good from the bad, and the cockle-seed and other foreign seeds or substances carried round by the cylinder and discharged upon the inclined shelf, whence they are carried off by the trough J.

What I claim is—

1. The combination of the wiper-wheel fixed on the shaft carrying and rotating the cylinder, the yoke arranged to slide vertically in guides, the lever L, and the cleaner I, arranged within the cylinder, as shown and described, to operate as specified.

2. The inclined plate N, made adjustable, as shown, in combination with the cylinder and the trough J, which is reciprocated, as set forth, to discharge cockle and other foreign seen, as shown and described.

3. The wiper-wheel provided with elastic blocks, one for each tooth, as and for the purpose specified.

HERMANN KURTH.

Witnesses:
 PETER J. SOMERS,
 THOMAS J. HOGAN.